(12) United States Patent
Viswanathan

(10) Patent No.: US 10,852,147 B2
(45) Date of Patent: Dec. 1, 2020

(54) METHOD, APPARATUS, AND COMPUTER PROGRAM PRODUCT FOR ESTABLISHING RELIABILITY OF CROWD SOURCED DATA

(71) Applicant: HERE Global B.V., Eindhoven (NL)

(72) Inventor: Anirudh Viswanathan, Berkeley, CA (US)

(73) Assignee: HERE GLOBAL B.V., Eindhoven (NL)

( * ) Notice: Subject to any disclaimer, the term of this patent is extended or adjusted under 35 U.S.C. 154(b) by 183 days.

(21) Appl. No.: 16/209,086

(22) Filed: Dec. 4, 2018

(65) Prior Publication Data
US 2020/0173786 A1    Jun. 4, 2020

(51) Int. Cl.
G01C 21/32 (2006.01)
G05D 1/02 (2020.01)
H04W 4/021 (2018.01)

(52) U.S. Cl.
CPC ............ *G01C 21/32* (2013.01); *G05D 1/0274* (2013.01); *G05D 1/0278* (2013.01); *H04W 4/021* (2013.01)

(58) Field of Classification Search
CPC ........ G01C 21/34; G01C 21/30; G01C 21/32; H04W 24/08; H04W 4/024; H04W 4/021; G05D 1/0278; G05D 1/0274
USPC ........................................................ 701/532
See application file for complete search history.

(56) References Cited

U.S. PATENT DOCUMENTS

| | | | |
|---|---|---|---|
| 8,717,387 B1 | 5/2014 | Brewington | |
| 9,953,523 B2* | 4/2018 | Linder | G08G 1/0133 |
| 2015/0073697 A1 | 3/2015 | Barrett et al. | |
| 2016/0054135 A1* | 2/2016 | Fowe | G01C 21/30 |
| | | | 701/117 |

\* cited by examiner

*Primary Examiner* — Gertrude Arthur Jeanglaude
(74) *Attorney, Agent, or Firm* — Alston & Bird LLP (57) ABSTRACT

A method, apparatus and computer program product are provided for establishing the reliability of crowd sourced data based on the source of the data and the region in which the data is gathered. Methods may include: receiving map data for a network of roads in a geographic area; receiving location accuracy data from different regions within the geographic area, where the location accuracy data for each region may be indicative of an accuracy with which location can be established in the respective region; receiving a plurality of probe data points; determining, for each probe data point, the location accuracy data associated with the location information associated with the respective probe apparatus; determining, for each probe apparatus, a reliability of the one or more sensors; and updating a map database based on at least one probe data point.

20 Claims, 3 Drawing Sheets

METHOD, APPARATUS, AND COMPUTER PROGRAM PRODUCT FOR ESTABLISHING RELIABILITY OF CROWD SOURCED DATA

TECHNOLOGICAL FIELD

An example embodiment relates generally to the crowd sourcing map data and, more particularly, to establishing the reliability of crowd sourced data based on the source of the data and the region in which the data is gathered.

BACKGROUND

Probe points are frequently captured by global positioning systems ("GPS"), navigation systems or the like. Each probe point is associated with a location, such as may be expressed in terms of latitude and longitude. Some probe points are also associated with a heading and a speed at which the GPS system or the navigation system was moving at the time at which the probe point was captured.

In some instances, such as within a region for which a map consisting of a plurality of road segments has been created, the probe points may be matched to the map in order to identify the location along a road segment at which the probe point was captured. Map matching may be performed in real time, such as by navigation systems in order to identify the location of the probe point relative to the road segments represented by the map. For example, navigation systems mounted within a vehicle may perform real time map matching in order to depict the relative position of a probe point upon a map, thereby illustrating the current location of the vehicle.

The probe data from vehicles traveling along the road segments may be used to inform map updates of road changes (e.g., properties of the road segment or a path of the road segment) and may inform traffic levels along the road segment. However, the reliability of probe data may vary widely, such that it is difficult to know what data may be reliable.

BRIEF SUMMARY

A method, apparatus and computer program product are provided in accordance with an example embodiment in order to establish the reliability of crowd sourced probe data based on the source of the data and a location in which the data was captured. Embodiments described herein may provide an apparatus including at least one processor and at least one non-transitory memory including program code instructions. The computer program code instructions may be configured to, when executed, cause the apparatus to: receive map data for a network of roads in a geographic area, receive location accuracy data from different regions within the geographic area, where the location accuracy data for each region is indicative of an accuracy with which location can be established in the respective region; receive a plurality of probe data points, each probe data point received from a probe apparatus of a plurality of probe apparatuses, each probe apparatus including one or more sensors and being onboard a respective vehicle, where each probe data point includes location information associated with the respective probe apparatus; determine, for each probe data point, the location accuracy data associated with the location information associated with the respective probe apparatus; determine, for each probe apparatus, a reliability of the one or more sensors; and update a map database based on at least one probe data point from the plurality of probe data points in response to the at least one probe data point satisfying a predetermined value for location accuracy data associated with the location information associated with the respective probe apparatus and the reliability of the one or more sensors of the respective probe apparatus satisfying a reliability value.

According to some embodiments, each probe apparatus includes a sensor level identification based on the one or more sensors of the respective probe apparatus, where causing the apparatus to determine, for each probe apparatus, a reliability of the one or more sensors includes causing the apparatus to determine the sensor level for each probe apparatus. Causing the apparatus to update the map database based, at least in part, on the reliability of the respective probe apparatus satisfying a reliability value includes causing the apparatus to update the map database based, at least in part, on the sensor level satisfying a sensor level value. The apparatus of some embodiments may be caused to facilitate autonomous vehicle control using the updated map database.

The apparatus of some embodiments may be caused to learn a new sensor configuration in response to the one or more sensors of a probe apparatus failing to correspond to a previously identified sensor configuration. Causing the apparatus to determine, for each probe apparatus, a reliability of the one or more sensors may include causing synthetic generation of sensor data from the new sensor configuration to establish a reliability of the new sensor configuration. Causing the apparatus to update a map database based on the at least one probe data point may include causing the apparatus to update a map database based on sensor data associated with the at least one probe data point. The sensor data associated with the at least one probe data point may include road segment information associated with the location information of the at least one probe data point.

Embodiments described herein may provide a computer program product including at least one non-transitory computer-readable storage medium having computer-executable program code portions stored therein. The computer-executable program code portions include program code instructions configured to: receive map data for a network of roads in a geographic area; receive location accuracy data from different regions within the geographic area, where the location accuracy data for each region is indicative of an accuracy with which location can be established in the respective region; receive a plurality of probe data points, each probe data point received from a probe apparatus of a plurality of probe apparatuses, each probe apparatus including one or more sensors and being onboard a respective vehicle, where each probe data point includes location information associated with the respective probe apparatus; determine, for each probe data point, the location accuracy data associated with the location information associated with the respective probe apparatus; determine, for each probe apparatus, a reliability of the one or more sensors; and update a map database based on at least one probe data point from the plurality of probe data points in response to the at least one probe data point satisfying a predetermined value for location accuracy data associated with the location information associated with the respective probe apparatus and the reliability of the one or more sensors of the respective probe apparatus satisfying a reliability value.

According to some embodiments, each probe apparatus may include a sensor level identification based on the one or more sensors of the respective probe apparatus, where the program code instructions to determine, for each probe apparatus, a reliability of the one or more sensors may include program code instructions to determine the sensor level for each probe apparatus. The program code instructions to update the map database based, at least in part, on the reliability of the respective probe apparatus satisfying a reliability value may include program code instructions to update the map database based, at least in part, on the sensor level satisfying a sensor level value. Embodiments may include program code instructions to facilitate autonomous vehicle control using the updated map database.

The computer program product of some embodiments may include program code instructions to learn a new sensor configuration in response to the one or more sensors of a probe apparatus failing to correspond to a previously identified sensor configuration. The program code instructions to determine, for each probe apparatus, a reliability of the one or more sensors may include program code instructions for synthetic generation of sensor data from the new sensor configuration to establish a reliability of the new sensor configuration. The program code instructions to update a map database based on the at least one probe data point may include program code instructions to update a map database based on sensor data associated with the at least one probe data point. The sensor data associated with the at least one probe data point may include road segment information associated with the location information of the at least one probe data point.

Embodiments of the present disclosure may provide a method including: receiving map data for a network of roads in a geographic area; receiving location accuracy data from different regions within the geographic area, where the location accuracy data for each region may be indicative of an accuracy with which location can be established in the respective region; receiving a plurality of probe data points, each probe data point received from a probe apparatus of a plurality of probe apparatuses, each probe apparatus including one or more sensors and being onboard a respective vehicle, where each probe data point includes location information associated with the respective probe apparatus; determining, for each probe data point, the location accuracy data associated with the location information associated with the respective probe apparatus; determining, for each probe apparatus, a reliability of the one or more sensors; and updating a map database based on at least one probe data point from the plurality of probe data points in response to the at least one probe data point satisfying a predetermined value for location accuracy data associated with the location information associated with the respective probe apparatus and the reliability of the one or more sensors of the respective probe apparatus satisfying a reliability value.

According to some embodiments, each probe apparatus may include a sensor level identification based on the one or more sensors of the respective probe apparatus, where determining, for each probe apparatus, a reliability of the one or more sensors may include determining the sensor level for each probe apparatus. Updating the map database based, at least in part, on the reliability of the respective probe apparatus satisfying a reliability value may include updating the map database based, at least in part, on the sensor level satisfying a sensor level value. Methods may include facilitating autonomous vehicle control using the updated map database.

Methods of example embodiments may include learning a new sensor configuration in response to the one or more sensors of a probe apparatus failing to correspond to a previously identified sensor configuration, where determining, for each probe apparatus, a reliability of the one or more sensors may include synthetically generating sensor data from the new sensor configuration to establish a reliability of the new sensor configuration. Updating a map database based on the at least one probe data point may include updating the map database based on sensor data associated with the at least one probe data point.

Embodiments of the present disclosure may provide an apparatus including: means for receiving map data for a network of roads in a geographic area; means for receiving location accuracy data from different regions within the geographic area, where the location accuracy data for each region may be indicative of an accuracy with which location can be established in the respective region; means for receiving a plurality of probe data points, each probe data point received from a probe apparatus of a plurality of probe apparatuses, each probe apparatus including one or more sensors and being onboard a respective vehicle, where each probe data point includes location information associated with the respective probe apparatus; means for determining, for each probe data point, the location accuracy data associated with the location information associated with the respective probe apparatus; means for determining, for each probe apparatus, a reliability of the one or more sensors; and means for updating a map database based on at least one probe data point from the plurality of probe data points in response to the at least one probe data point satisfying a predetermined value for location accuracy data associated with the location information associated with the respective probe apparatus and the reliability of the one or more sensors of the respective probe apparatus satisfying a reliability value.

According to some embodiments, each probe apparatus may include a sensor level identification based on the one or more sensors of the respective probe apparatus, where the means for determining, for each probe apparatus, a reliability of the one or more sensors may include means for determining the sensor level for each probe apparatus. The means for updating the map database based, at least in part, on the reliability of the respective probe apparatus satisfying a reliability value may include means for updating the map database based, at least in part, on the sensor level satisfying a sensor level value. An apparatus may include means for facilitating autonomous vehicle control using the updated map database.

Apparatuses of example embodiments may include means for learning a new sensor configuration in response to the one or more sensors of a probe apparatus failing to correspond to a previously identified sensor configuration, where the means for determining, for each probe apparatus, a reliability of the one or more sensors may include means for synthetically generating sensor data from the new sensor configuration to establish a reliability of the new sensor configuration. The means for updating a map database based on the at least one probe data point may include means for updating the map database based on sensor data associated with the at least one probe data point.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment in order to use crowd sourced probe data to provide map updates and to facilitate map construction. Vehicles equipped with sensors may drive along a road segment and produce probe data indicative of the road segment and properties thereof. Depending upon the capabilities of the sensors of the vehicle, data may include a path of the roadway, a travel speed along the roadway, imagery identifying lane lines or signage along the roadway such as speed limits, stop signs, etc., distance sensors such as Light Imaging, Detection and Ranging (LIDAR) may provide locations and sizes of objects along a roadway, etc. In order to have sufficient coverage of geographic regions, road segments may require a plurality of probes to travel along a road segment in order to provide reliable data relating to the road segment. For example, due to inaccuracies in locationing mechanisms such as global positioning systems (GPS), the location identified by a vehicle probe along a road segment may actually be a location off of the road segment by several meters. Increasing the number of data points gathered by vehicle probes along a road segment mitigates errors in sensors such as GPS to achieve a more reliable crowd-sourced representation of the road segment and the data collected thereon. However, some probe data may be more reliable than other probe data, and discerning which probe data is most reliable is difficult when using crowd sourced data. Embodiments described herein establish reliability of probe data using regions of trust for mapped regions within a high-definition (HD) map and the sensor suite of a vehicle from which the sensor data is generated.

Figure 1:
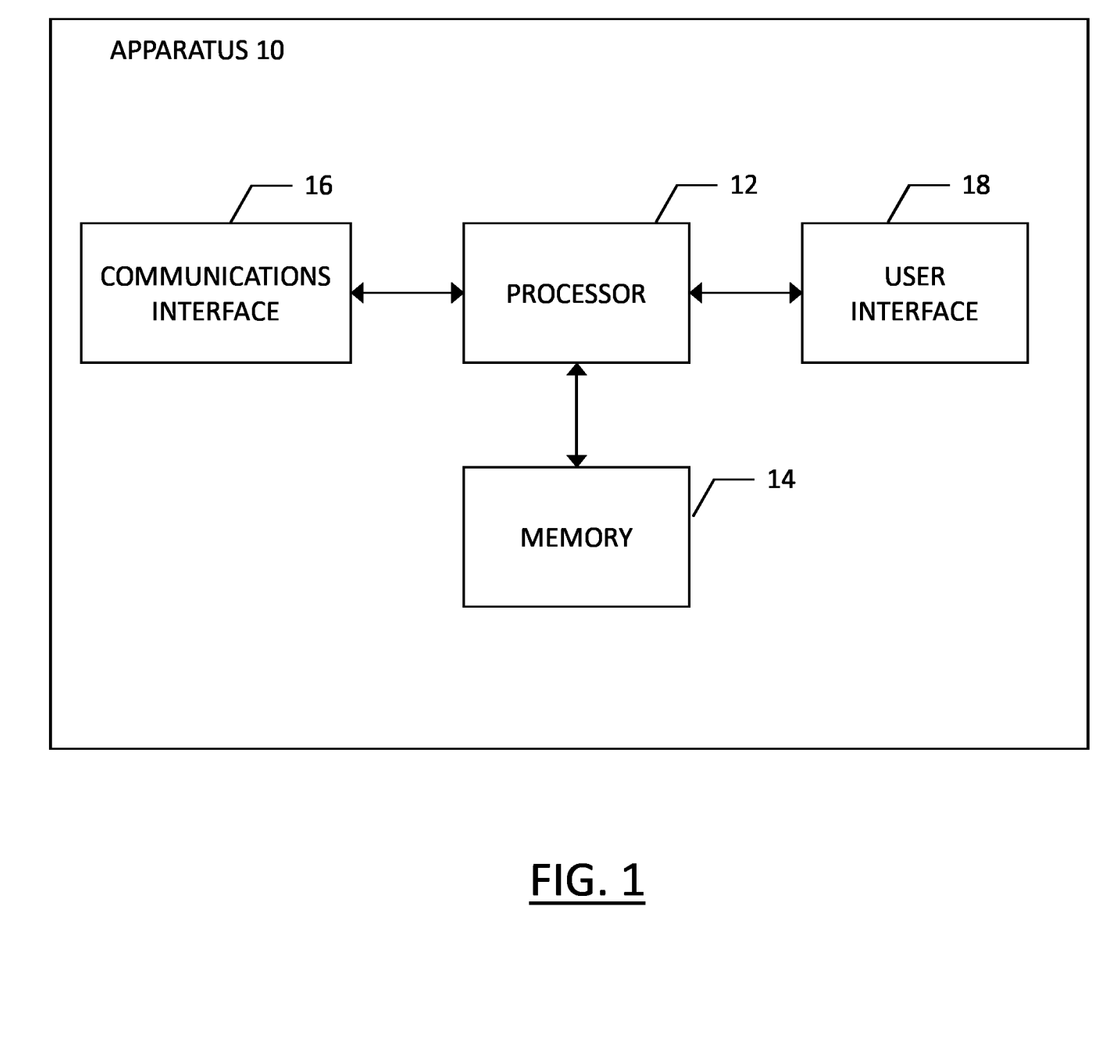
FIG. 1 is a block diagram of an apparatus according to an example embodiment of the present disclosure.

Embodiments described herein may use an apparatus to collect and send probe data to a map services provider which may, in turn, update map data according to the collected data. The apparatus may optionally benefit from the collection and providing of probe data to the map services provider as the apparatus of example embodiments may provide route guidance to a user and may facilitate autonomous or semi-autonomous vehicle control. The apparatus of an example embodiment may be embodied by a variety of computing devices including, for example, a navigation system, an advanced driver assistance system (ADAS), a GPS system or the like. Additionally or alternatively, the apparatus may be embodied in other types of computing devices, particularly when the evaluation of the reliability of sensor data from probes is performed by a map services provider, which may be embodied by a server, a computer workstation, a plurality of networked computing devices or the like, that are configured to communicate with or function as the map services provider as described herein. In this regard, FIG. 1 depicts the apparatus 10 of an example embodiment that may be embodied by various computing devices including those identified above. As shown, the apparatus of an example embodiment may include, may be associated with or may otherwise be in communication with a processor 12 and a memory device 14 and optionally a communication interface 16 and/or a user interface 18.

In some embodiments, the processor 12 (and/or co-processors or any other processing circuitry assisting or otherwise associated with the processor) may be in communication with the memory device 14 via a bus for passing information among components of the apparatus 10. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 10 of an example embodiment also optionally includes a communication interface 16 that may be any means such as a device or circuitry embodied in either hardware or a combination of hardware and software that is configured to receive and/or transmit data from/to other electronic devices in communication with the apparatus, such as by being configured to receive probe data from a sensor or plurality of sensors, and provide said probe data to a database, cloud storage or other external memory device associated with the map services provider. The communication interface may be configured to receive data, such as from a map services provider including a representation of the road geometry to an in-vehicle global positioning system (GPS), in-vehicle navigation system, a personal navigation device (PND), a portable navigation device or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

As illustrated in FIG. 1, the apparatus 10 may also optionally include or otherwise be in communication with a user interface 18. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 12 may comprise user interface circuitry configured to control at least some functions of one or more input/output mechanisms. The user interface 18 may include, for example, a display to provide navigational assistance or route guidance to a user based on data received from the map services provider. The processor and/or user interface circuitry comprising the processor may be configured to control one or more functions of one or more input/output mechanisms through computer program instructions (for example, software and/or firmware) stored on a memory accessible to the processor (for example, memory device 14 and/or the like).

The apparatus 10 may support a mapping or navigation application so as to present maps or otherwise provide navigation or driver assistance. In order to support a mapping application, the computing device may include or otherwise be in communication with a geographic database, such as may be stored in memory 14. For example, the geographic database includes node data records, road segment or link data records, point of interest (POI) data records, and other data records. More, fewer or different data records can be provided. In one embodiment, the other data records include cartographic data records, routing data, and maneuver data. In order to fully utilize map data within the map database, accurate map-matching of probe data points to locations on the map, such as road segments or links, is necessary.

In example embodiments, a navigation system user interface may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle through map-matching techniques described herein. Semi-autonomous vehicle control may be any level of driver assistance from adaptive cruise control, to lane-keep assist, or the like.

Figure 2:
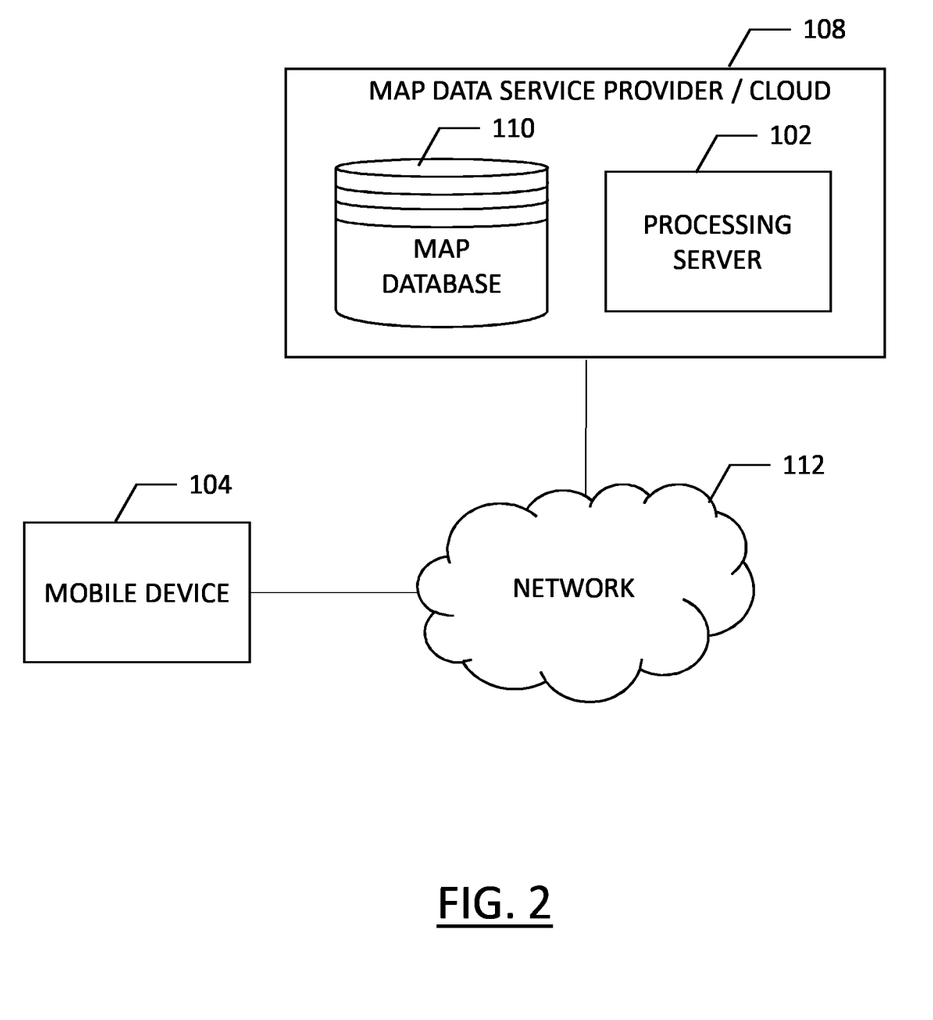
FIG. 2 is a block diagram of a system for establishing the reliability of crowd sourced data based on the source of the data and the region in which the data is gathered according to an example embodiment of the present disclosure.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 10 of FIG. 1, such as a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning as described herein. However, the most ubiquitous form of data that may be available is vehicle data provided by vehicles, such as mobile device 104, as they travel the roads throughout a region.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a physical storage format (PSF)) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can include the apparatus 20 of FIG. 1 and can be embodied by an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments.

In order for the map database 110 to be effective, the map database should include as much detail regarding all road segments within a network of roads in order to provide the most accurate and efficient routing of vehicles through the network of roads. However, issues exist with gathering probe data relating to road segments, particularly those less traveled. Generating reliable data related to a road segment may be challenging when a road segment is not traversed by a specially-equipped vehicle specifically configured for map data generation and updating. Such vehicles may be employed by map data service providers; however, these vehicles cannot reasonably traverse every road segment of a region, particularly in view of changes to roadways that occur over time.

Advances in vehicle technology are resulting in more vehicles on the road with a greater degree of autonomy, which necessitates greater levels of sensor capability. The ubiquity of vehicles traveling along road segments with at least some degree of sensed data provides large volumes of data with respect to the road segments. However, the reliability of the data may be uncertain, such that the potentially unreliable data may not be usable for map updates. Embodiments provided herein broadly relate to updating map data with crowd sourced data sources using an automated method of establishing the reliability of the crowd sourced data. Specifically, embodiments described herein use regions of trust as a mechanism to weigh different data sources before feature aggregation and map updating process.

Map data generation and updating may rely on various sources for data relating to road location, geometry, and features of the roadway. Data may be generated or provided by municipalities, utility companies, transportation departments, map data providers, vehicle manufacturers, navigation system manufacturers, etc. These data sources may be diverse and may provide different levels of detail and varying degrees of accuracy. Data aggregation from heterogeneous data sources is complex since data from different vendors or sources may include different internal data processing algorithms and filtering techniques. Further, data sources may be in different price points that are tied to signal reliability and repeatability. Embodiments described herein use a learning-based approach to filtering data sources based on regions of trust in which different configurations of sensors, when combined with signal reliability of prior globally positioned data points, may be used to identify regions of trust on the map from which the data accuracy can be assumed valid for a given context. Specific sensor configurations or "sensor suites" with known capabilities may be validated given a region of trust, and acknowledged as trusted sensor configurations for a given region of a map.

Presently, data aggregation from crowd sourced map data involves manually ingesting and aligning the data to a pre-existing HD map, or using automated techniques such as localization for registering the crowd sourced data to an existing HD map. The manual data annotation step, while accurate, is expensive and labor intensive such that it does not scale to data sources spanning millions of data collection vehicles that may be available through crowd sourced data collection. The automated technique requires domain expertise and tuning of the localization framework parameters to maintain performance of data sources from different vendors.

Embodiments described herein define regions of trust that are tied to both the sensor suite from a particular vehicle as well as to previously mapped regions. Certain regions of an HD map, such as those with GPS coverage that provides relatively accurate results (e.g., good GPS coverage and signal) may be considered "trusted" when data sources tied to GPS are used in the feature aggregation step. In an HD map, certain regions may be well covered by GPS in that vehicles or GPS antennae within the region may be visible to a plurality of GPS satellites with minimal signal distortion. These are trusted regions. Other areas of a region may include large amounts of vegetation (e.g., tree canopies), urban canyons (e.g., tall buildings), or geological features (e.g., mountains or canyons), which may reduce the accuracy of GPS within the region. Further, some regions may have sparse GPS satellite coverage. Vehicles and GPS antennae in these regions may not have a line-of-sight to multiple GPS satellites and may suffer from signal distortion as signals are reflected from obstructions in the area. An evaluation of whether a region is trusted or not may be generated based on a trusted vehicle or apparatus traversing a region and establishing the quality and reliability of the GPS signals in a region. The trusted vehicle or apparatus may be part of the map data service provider or employed by a map data service provider or vendor thereof such that an HD map may include regions defined as trusted regions or otherwise.

Through an understanding of trusted regions of the HD map, and based upon sensor suites of a vehicle or apparatus that are of a known and trusted configuration and quality, the sensor data crowd sourced from vehicles may be parsed automatically to identify reliable sensor data generated in trusted regions that do not necessitate manual intervention. Sensor data from vehicles or apparatuses of a configuration known to be reliable traveling through regions of trust where the GPS location can be relied upon may be interpreted as trustworthy and may contribute to map generation and updating automatically, thereby enhancing the HD map quality without the expense and time require of manually qualified data.

In order to automate the process of establishing trustworthy sensor data, regions of trust must first be developed in the HD map. Vehicles or apparatuses that are employed by the map service provider may be used to determine satellite signal coverage and alignment offsets of ground projected data to registered satellite imagery. For a specified area of the map, for each location where such known-good data exists, the registration offset/covariance combined with the satellite quality may be used to define trusted regions on the map. Registration of gathered data occurs when the gathered map data is map-matched to a location within the mapped region to which it is "registered." The offset is a measure of how far from the map-matched/registered position differs from the reported position of the gathered data, while the covariance may represent the variability of data gathered along a road segment. The alignment metric may be as basic as a correlation score between observed features on the satellite imagery and ground-projected true data.

Once regions of trust are established, sensor data from those regions may be used to facilitate automated map updates and generation. However, an understanding of the sensor capabilities of the vehicle or apparatus traversing the trusted region of the map must be realized in order to validate the sensor data. Certain sensor configurations may be established as standards or levels of sensor capability. Map services providers may use minimum sensor thresholds and capabilities to certify sensor suites and configurations in order to better evaluate sensor data received from different sensor suites. For sensor configurations that are certified by the map services provider to enable accurate and automated map updates, the different sensor configurations may be synthetically generated with standard sensor error metrics. Such sensor configurations may be used to synthetically generate data for a known region that has been mapped using known-good data, such as from a map services employed instrumented vehicle/apparatus. For a new sensor configuration from a third party manufacturer, the error metrics may be compared to the synthetically generated data and error metrics generated when registering the sensor to the map services provider. Sensor error metrics that lie within an upper bound of the HD map accuracy requirements may be considered to be certified. The combination of certified sensor configurations and regions of trust on the map enable fast, reliable map updating to maintain the HD maps through automated approval of trusted sensor data within trusted regions.

Figure 3:
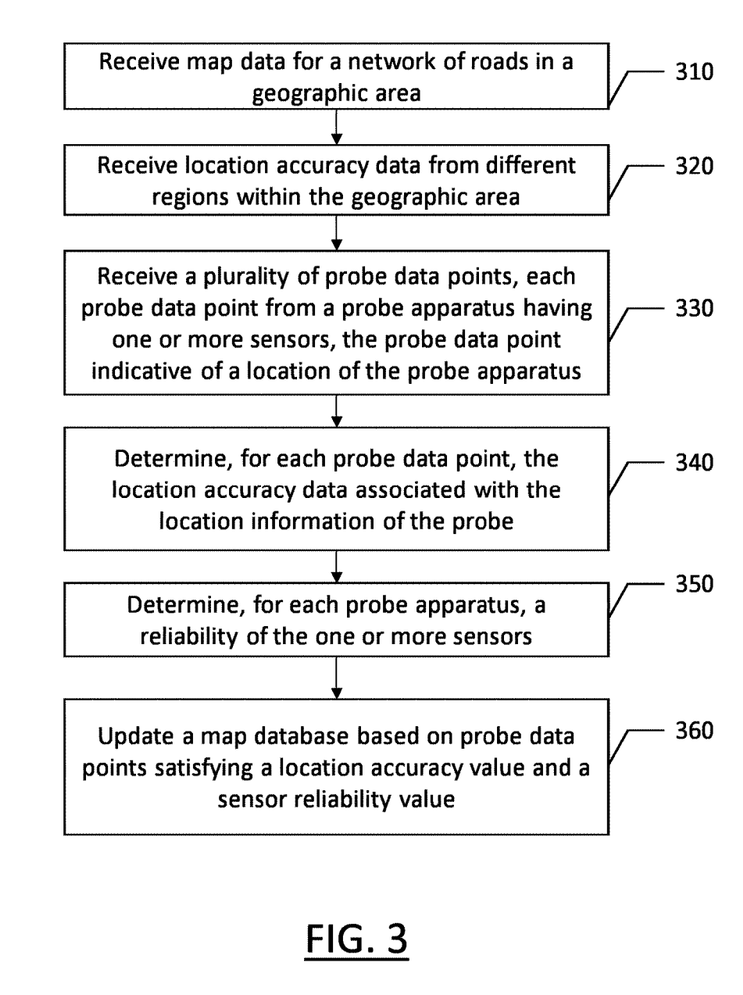
FIG. 3 is a flowchart illustrating the operations performed, such as by the apparatus of FIG. 1, in order to establish the reliability of crowd sourced data based on the source of the data and the region in which the data is gathered.

FIG. 3 illustrates a flowchart of an apparatus, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present invention and executed by a processor 12 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

According to the example embodiment of FIG. 3, map data for a network of roads in a geographic area is received at 310. Location accuracy data of different regions within the geographic area is received at 320. This data represents how accurately location can be determined within the different regions of the geographic area. A plurality of probe data points are received at 330, where each probe data point is from a respective probe apparatus of a plurality of probe apparatus, with each probe apparatus including one or more sensors and being onboard a respective vehicle. Each probe data point may include location information associated with the respective probe apparatus. At 340, the location accuracy data associated with the location information is determined for each probe data point. A reliability of the one or more sensors for each probe apparatus is determined at 350. At 360, a map database is updated based on at least one probe data point from the plurality of probe data points in response to the at least one probe data point satisfying a predetermined value for location accuracy data associated with the location information associated with the respective probe apparatus and the reliability of the one or more sensors of the respective probe apparatus satisfying a reliability value.

In an example embodiment, an apparatus for performing the method of FIG. 3 above may comprise a processor (e.g., the processor 12) configured to perform some or each of the operations (310-360) described above. The processor may, for example, be configured to perform the operations (310-360) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 310-360 may comprise, for example, the processor 12 and/or a device or circuit for executing instructions or executing an algorithm for processing information as described above.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
   receive map data for a network of roads in a geographic area;
   receive location accuracy data from different regions within the geographic area, wherein the location accuracy data for each region is indicative of an accuracy with which a location is able to be established in the respective region;
   receive a plurality of probe data points, each probe data point received from a probe apparatus of a plurality of probe apparatuses, each probe apparatus comprising one or more sensors and being onboard a respective vehicle, wherein each probe data point comprises location information associated with the respective probe apparatus;
   determine, for each probe data point, the location accuracy data associated with the location information associated with the respective probe apparatus;
   determine, for each probe apparatus, a reliability of the one or more sensors; and
   update a map database based on at least one probe data point from the plurality of probe data points in response to the at least one probe data point satisfying a predetermined value for location accuracy data associated with the location information associated with the respective probe apparatus and the reliability of the one or more sensors of the respective probe apparatus satisfying a reliability value.

2. The apparatus of claim 1, wherein each probe apparatus comprises a sensor level identification based on the one or more sensors of the respective probe apparatus, wherein causing the apparatus to determine, for each probe apparatus, a reliability of the one or more sensors comprises causing the apparatus to determine the sensor level for each probe apparatus.

3. The apparatus of claim 2, wherein causing the apparatus to update the map database based, at least in part, on the reliability of the respective probe apparatus satisfying a reliability value comprises causing the apparatus to update the map database based, at least in part, on the sensor level satisfying a sensor level value.

4. The apparatus of claim 1, wherein the apparatus is further caused to facilitate autonomous vehicle control using the updated map database.

5. The apparatus of claim 1, wherein the apparatus is further caused to learn a new sensor configuration in response to the one or more sensors of a probe apparatus failing to correspond to a previously identified sensor configuration, wherein causing the apparatus to determine, for each probe apparatus, a reliability of the one or more sensors comprises causing synthetic generation of sensor data from the new sensor configuration to establish a reliability of the new sensor configuration.

6. The apparatus of claim 1, wherein causing the apparatus to update a map database based on the at least one probe data point comprises causing the apparatus to update the map database based on sensor data associated with the at least one probe data point.

7. The apparatus of claim 6, wherein the sensor data associated with the at least one probe data point comprises road segment information associated with the location information of the at least one probe data point.

8. A computer program product comprising at least one non-transitory computer-readable storage medium having computer-executable program code portions stored therein, the computer-executable program code portions comprising program code instructions configured to:
receive map data for a network of roads in a geographic area;
receive location accuracy data from different regions within the geographic area, wherein the location accuracy data for each region is indicative of an accuracy with which a location is able to be established in the respective region;
receive a plurality of probe data points, each probe data point received from a probe apparatus of a plurality of probe apparatuses, each probe apparatus comprising one or more sensors and being onboard a respective vehicle, wherein each probe data point comprises location information associated with the respective probe apparatus;
determine, for each probe data point, the location accuracy data associated with the location information associated with the respective probe apparatus;
determine, for each probe apparatus, a reliability of the one or more sensors; and
update a map database based on at least one probe data point from the plurality of probe data points in response to the at least one probe data point satisfying a predetermined value for location accuracy data associated with the location information associated with the respective probe apparatus and the reliability of the one or more sensors of the respective probe apparatus satisfying a reliability value.

9. The computer program product of claim 8, wherein each probe apparatus comprises a sensor level identification based on the one or more sensors of the respective probe apparatus, wherein the program code instructions to determine, for each probe apparatus, a reliability of the one or more sensors comprise program code instructions to determine the sensor level for each probe apparatus.

10. The computer program product of claim 9, wherein the program code instructions to update the map database based, at least in part, on the reliability of the respective probe apparatus satisfying a reliability value comprise program code instructions to update the map database based, at least in part, on the sensor level satisfying a sensor level value.

11. The computer program product of claim 8, further comprising program code instructions to facilitate autonomous vehicle control using the updated map database.

12. The computer program product of claim 8, further comprising program code instructions to learn a new sensor configuration in response to the one or more sensors of a probe apparatus failing to correspond to a previously identified sensor configuration, wherein the program code instructions to determine, for each probe apparatus, a reliability of the one or more sensors comprise program code instructions for synthetic generation of sensor data from the new sensor configuration to establish a reliability of the new sensor configuration.

13. The computer program product of claim 8, wherein the program code instructions to update a map database based on the at least one probe data point comprise program code instructions to update the map database based on sensor data associated with the at least one probe data point.

14. The computer program product of claim 13, wherein the sensor data associated with the at least one probe data point comprises road segment information associated with the location information of the at least one probe data point.

15. A method comprising:
receiving map data for a network of roads in a geographic area;
receiving location accuracy data from different regions within the geographic area, wherein the location accuracy data for each region is indicative of an accuracy with which a location is able to be established in the respective region;
receiving a plurality of probe data points, each probe data point received from a probe apparatus of a plurality of probe apparatuses, each probe apparatus comprising one or more sensors and being onboard a respective vehicle, wherein each probe data point comprises location information associated with the respective probe apparatus;
determining, for each probe data point, the location accuracy data associated with the location information associated with the respective probe apparatus;
determining, for each probe apparatus, a reliability of the one or more sensors; and
updating a map database based on at least one probe data point from the plurality of probe data points in response to the at least one probe data point satisfying a predetermined value for location accuracy data associated with the location information associated with the respective probe apparatus and the reliability of the one or more sensors of the respective probe apparatus satisfying a reliability value.

16. The method of claim 15, wherein each probe apparatus comprises a sensor level identification based on the one or more sensors of the respective probe apparatus, wherein determining, for each probe apparatus, a reliability of the one or more sensors comprises determining the sensor level for each probe apparatus.

17. The method of claim 16, wherein updating the map database based, at least in part, on the reliability of the respective probe apparatus satisfying a reliability value comprises updating the map database based, at least in part, on the sensor level satisfying a sensor level value.

18. The method of claim 15, further comprising facilitating autonomous vehicle control using the updated map database.

19. The method of claim 15, further comprising learning a new sensor configuration in response to the one or more sensors of a probe apparatus failing to correspond to a previously identified sensor configuration, wherein determining, for each probe apparatus, a reliability of the one or more sensors comprises synthetically generating sensor data from the new sensor configuration to establish a reliability of the new sensor configuration.

20. The method of claim 15, wherein updating a map database based on the at least one probe data point comprises updating the map database based on sensor data associated with the at least one probe data point.

* * * * *